US012709078B2

(12) United States Patent
Bessac et al.

(10) Patent No.: US 12,709,078 B2
(45) Date of Patent: Aug. 18, 2026

(54) DEVICE FOR ASSEMBLING THE SPOKES OF A TIRE FOR A WHEEL BY MEANS OF THRUST MEMBERS ACTUATED BY RAMPED PUNCHES

(71) Applicant: COMPAGNIE GENERALE DES ETABLISSEMENTS MICHELIN, Clermont-Ferrand (FR)

(72) Inventors: Christophe Bessac, Clermont-Ferrand (FR); Lucie Chevrel, Clermont-Ferrand (FR); Jean-Claude Delorme, Clermont-Ferrand (FR); Yorrick Bunge, Clermont-Ferrand (FR); David Bouchereau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 189 days.

(21) Appl. No.: 18/710,517

(22) PCT Filed: Oct. 25, 2022

(86) PCT No.: PCT/FR2022/052016
§ 371 (c)(1),
(2) Date: May 15, 2024

(87) PCT Pub. No.: WO2023/084170
PCT Pub. Date: May 19, 2023

(65) Prior Publication Data

US 2025/0010661 A1 Jan. 9, 2025

(30) Foreign Application Priority Data

Nov. 15, 2021 (FR) ...................................... 2112029

(51) Int. Cl.
*B29D 30/02* (2006.01)

(52) U.S. Cl.
CPC .................................... *B29D 30/02* (2013.01)

(58) Field of Classification Search
CPC ...................................................... B29D 30/02
(Continued)

(56) References Cited

U.S. PATENT DOCUMENTS 9,278,494 B2 3/2016 Anderson et al.
11,597,234 B2 3/2023 Wilson et al.
(Continued)

FOREIGN PATENT DOCUMENTS

JP 4054056 B1 * 2/2008 ............... B60B 9/10
WO 2013/130047 A2 9/2013
(Continued)

OTHER PUBLICATIONS

Fusami Fukunaga, JP-4054056-B1, machine translation. (Year: 2008).*
(Continued)

*Primary Examiner* — Sedef E Paquette
(74) *Attorney, Agent, or Firm* — VENABLE LLP

(57) ABSTRACT

An assembly device for assembling an airless tire (2) that comprises a hub (3) having a central axis (Z3), a peripheral annular band (4) and a plurality of spokes (5) that connect the hub (3) to the peripheral annular band (4), comprises a plurality of pressing sub-assemblies (10) each comprising pushers (11, 12) to press the ends (6, 7) of the spokes (5) against the hub (3) and against the peripheral annular band (4), respectively, as well as a punch (13) that is mounted movably in axial translation parallel to the central axis (Z3), and provided with ramps (15, 16) arranged so that the axial movement of the punch causes the pushers (11, 12) to move radially.

11 Claims, 7 Drawing Sheets

(58) Field of Classification Search
USPC ........................................................ 156/110.1
See application file for complete search history.

(56) References Cited

U.S. PATENT DOCUMENTS

| | | | |
|---|---|---|---|
| 11,926,114 B2 | 3/2024 | Lung et al. | |
| 2015/0017277 A1 | 1/2015 | Anderson et al. | |
| 2015/0210025 A1 | 7/2015 | Martin | |
| 2019/0283500 A1* | 9/2019 | Wilson | B60B 9/26 |
| 2020/0276863 A1 | 9/2020 | Wilson et al. | |
| 2020/0376789 A1 | 12/2020 | Lung et al. | |
| 2025/0010660 A1 | 1/2025 | Bessac et al. | |

FOREIGN PATENT DOCUMENTS

| | | |
|---|---|---|
| WO | 2018/125188 A1 | 7/2018 |
| WO | 2018/125190 A1 | 7/2018 |
| WO | 2019/103728 A1 | 5/2019 |

OTHER PUBLICATIONS

International Search Report dated Feb. 1, 2023, in corresponding PCT/FR2022/052016 (4 pages).

* cited by examiner

A-A 11
17
15
38
13
Z13
32
37
16
12
18

H3
H6, H11
5
3
6
11
F15
17
19
15
Z13
32
37

10
4
7
12
19
H0
F16
18
16
H7, H12
H4
5
6
11
15
11B
17, 21
24
38
Z13
32
37
13T
13
14
31
7
12
16
23
12B
18, 22
30
10

DEVICE FOR ASSEMBLING THE SPOKES OF A TIRE FOR A WHEEL BY MEANS OF THRUST MEMBERS ACTUATED BY RAMPED PUNCHES

BACKGROUND

The present invention relates to the field of manufacturing tyres for vehicle wheels, and more particularly manufacturing so-called "airless" tyres, in which a peripheral annular band comprising the tread is mechanically supported by a plurality of solid spokes that connect said peripheral annular band to a hub.

WO2019/103728 describes a tool that makes it possible to fasten the spokes simultaneously to the hub and to the peripheral annular band, by pressing one end of each of said spokes against said hub and the other end of each of said spokes against the peripheral annular band, by means of pushers that are radially driven by annular inflatable membranes.

More specifically, in this known tool, all of the pushers that act in a centripetal radial direction to press the radially inner ends of the different spokes against the hub are driven simultaneously by a first set of two membranes, which comprises a lower membrane situated on the back of one of the axial ends of said pushers, and an upper membrane situated on the back of the other axial end of said pushers.

Likewise, all of the pushers that act in a centrifugal radial direction to press the radially outer ends of these same spokes against the peripheral annular band are driven simultaneously by a second set of two membranes that respectively engage against the back of the two opposite axial ends of said pushers.

Although such a tool is generally satisfactory, it can however have certain limitations.

In particular, such a tool can be relatively sensitive to any local variations in the friction exerted on the different pushers during the radial movements of said different pushers, or to variations in the individual mechanical behaviour of the different spokes in reaction to the inflation of the membrane and the corresponding action of the pushers, or else to any uneven distribution of the inflation gas either within a single membrane or between two membranes of a single set of membranes.

Depending on the circumstances, it is actually possible for these factors to cause the pushers to jam through a bracing effect, or to cause a slight positioning defect of some spokes, which can sometimes result in undesirable overlapping of the ends of two neighbouring spokes.

Further, the aforementioned factors can also cause a degree of non-uniformity, from one spoke to another, in the intensity of the radial compressive forces that press the different spokes against the hub or against the peripheral annular band, respectively, during the spoke bonding process. Now, if the radial compressive force exerted during assembly is significantly insufficient, this can potentially lead to the appearance of a weak zone in the join between the end of the spoke and the hub or the peripheral annular band, respectively, and therefore to the scrapping of the tyre.

For all of these reasons, it can sometimes be difficult to obtain a completely uniform tyre at the end of the known assembly process, or to guarantee that said process is completely repeatable from one tyre to another.

In addition, the membranes can be subject to mechanical attack, in particular by abrasion, cutting or puncturing, which can in some cases limit the service life of the tool.

SUMMARY

The objects of the invention therefore aim to overcome the aforementioned drawbacks and propose a particularly robust and durable novel assembly tool that allows fast, repeatable, reliable and accurate manufacturing of airless tyres having a uniform structure of excellent quality.

The objectives assigned to the invention are met by means of an assembly device for manufacturing a tyre that comprises a hub having a central axis, a peripheral annular band coaxial with the hub, and a plurality of spokes that connect the hub to the peripheral annular band and to this end each comprise a first end fastened on a radially outer face of said hub forming a first receiving face and a second end fastened on a radially inner face of said peripheral annular band forming a second receiving face, said assembly device comprising a plurality of pressing sub-assemblies that are each assigned to fastening a separate spoke and that each comprise at least one pusher arranged to press one of the first and second ends of the spoke in question against the receiving face of the hub or of the peripheral annular band, respectively, that corresponds to said end of the spoke, said assembly device being characterized in that each of said pressing sub-assemblies comprises a punch that is mounted movably in an axial direction parallel to the central axis, under the control of a drive system, and that has at least one ramp which, in a radial plane containing the central axis, diverges progressively from the axial direction and collaborates with a bearing member secured to the pusher so that when the drive system moves the punch axially against the bearing member, the ramp causes said bearing member and, therefore, the pusher to move radially and thus, via the bearing member, generates a clamping force that presses said pusher and, therefore, the end of the spoke radially against the receiving face.

Advantageously, the arrangement proposed by the invention makes it possible, due to the multiple pressing sub-assemblies, to act simultaneously on several spokes, preferably on all of the spokes, in order to achieve assembly, and in particular assembly by bonding, in a very short time, typically in a single step, while nonetheless benefiting from individual management of the pushers, because the axial travel of each punch, and therefore of the pusher or pushers actuated by said punch, can be individually adjusted and controlled.

Advantageously, such an arrangement notably makes it possible for a suspension spring to be associated easily with each punch by axially interposing said suspension spring between the drive system and the punch, so as to give the punch an apparent resilience that allows the pressing sub-assembly to adjust the axial force exerted by the drive system on the punch, and the axial travel of the punch relative to the pusher, and therefore adjust the intensity of the radial clamping force that the ramp of the punch develops, by conversion of movement, against the pusher and against the end of the spoke that rests against the receiving face.

Thus, each pressing sub-assembly is capable of adapting to suit the specific configuration of each pusher and of each end, which configuration is notably linked with the dimensional tolerances of manufacture of these parts.

Further, the use of a punch according to the invention makes it possible to place the bearing member axially at an axial distance from the drive system, and therefore makes it possible for said drive system to be installed in a region of space that does not interfere with the region occupied by the pusher and the spoke.

The guide and drive system can thus be sized so as to guarantee accurate, robust and powerful driving of the pushers, all while positioning the point of application of the radial clamping force that the punch exerts on the pusher in a contact area that is substantially axially centred relative to the end of the spoke to be compressed, and more particularly while positioning said point of application of the clamping force substantially at the centre of the axial length of the pusher so that, on the one hand, any accidental tilting and any jamming of the pusher through a bracing effect during the radial movement of said pusher is prevented, and so that, on the other hand, said pusher acts as a spreader that substantially uniformly distributes the clamping force over the whole axial extent of the end of the spoke, which guarantees high-quality fastening.

Additionally, the invention makes it possible to produce compact pressing sub-assemblies made up of a small number of parts which are therefore particularly robust and reliable.

Finally, the relative simplicity of the structure of the assembly device according to the invention, and therefore its relative lightness of weight, make it possible to limit the thermal inertia of said device, which improves the cycle time when said cycle comprises, while the pushers are holding the ends of the spokes pressed against the hub and/or against the peripheral annular band, a heating phase for securing the spokes to the hub and to the peripheral annular band, by bonding.

BRIEF DESCRIPTION OF THE FIGURES

Further aims, features and advantages of the invention will become apparent in further detail from reading the following description and from reference to the appended drawings, which are provided purely by way of illustration and without limitation, and in which.

DETAILED DESCRIPTION

The present invention relates to an assembly device 1 intended for manufacturing a tyre 2.

Said tyre 2 is intended to be fitted on a vehicle wheel.

Figure 1:
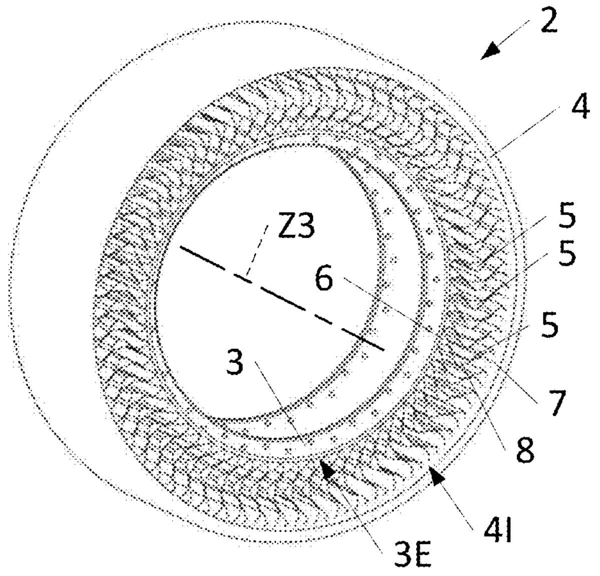
FIG. 1 is a perspective view of an airless tyre assembled by a device according to the invention.

Said tyre 2 comprises a hub 3 having a central axis Z3, a peripheral annular band 4 coaxial with the hub 3, and a plurality of spokes 5 that connect the hub 3 to the peripheral annular band 4, as illustrated in FIG. 1.

The spokes 5 advantageously make it possible to mechanically support the peripheral annular band 4 relative to the hub 3, without the need to provide a pneumatic chamber for receiving a pressurized inflation gas. The tyre 2 is thus preferably a so-called "airless" tyre.

Here, "peripheral annular band" 4 very generically denotes the annular structure of the tyre 2, which is supported by the spokes 5 and forms the tread for coming into contact with the road. Said peripheral annular band 4 can thus preferably, in a manner known per se, have a layered structure that comprises a radially inner reinforcing crown, containing one or more layers containing reinforcing threads or reinforcing fibres embedded in a resin and/or in a rubber-based material, and then a radially outer layer containing one or more rubber-based materials, and which forms the tread of the tyre 2.

The hub 3 is a rigid, or semi-rigid, circular ring, for example made from a metal alloy or a composite material, which can be designed to be mounted on a rim, or to form a rim in itself capable of being mounted directly on a vehicle axle or wheel shaft.

Hereinafter, the terms "axial" and "axially" refer to directions that are parallel to the central axis Z3, while the terms "radial" and "radially" refer to directions that are perpendicular to said central axis Z3.

Figure 2:
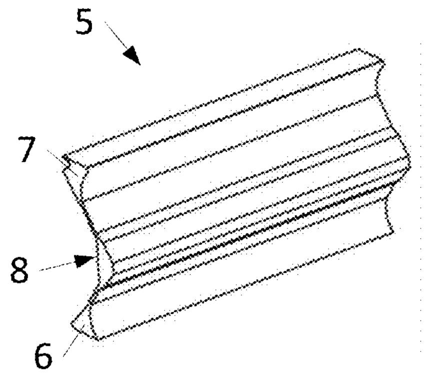
FIG. 2 illustrates, in a perspective view, a spoke of the tyre of FIG. 1.

Each of the spokes 5 comprises, as can be seen in FIGS. 1 and 2, a first end 6 that is fastened to a radially outer face 3E of the hub 3, which forms a first receiving face 3E, and a second end 7 that is fastened to a radially inner face 4I of the peripheral annular band 4 forming a second receiving face 4I.

Here, the radially outer face 3E of the hub 3, which forms the first receiving face 3E, is a convex cylindrical face with a circular base centred on the central axis Z3.

Likewise, the radially inner face 4I of the peripheral annular band 4 forming the second receiving face 4I is, here, a concave cylindrical face with a circular base centred on the central axis Z3.

The diameter of the first receiving face 3E belonging to the hub 3 is of course strictly smaller than the diameter of the second receiving face 4I belonging to the peripheral annular band 4, the difference being filled by the spokes 5.

The diameter of the hub 3, and more particularly the diameter of the radially outer face 3E of said hub 3 on which the spokes 5 come to rest, can be between 30 cm and 60 cm.

The overall outer diameter of the peripheral annular band 4 can itself be between 50 cm and 90 cm, and the overall width of said peripheral annular band, taken along the central axis Z3, can be between 100 mm and 400 mm.

More preferably, the hub 3 can form a rim or be mounted on a rim that has dimensions that correspond to the standardized sizes of the 12-inch to 24-inch rims used for usual pneumatic tyres. Likewise, the tyre 2 can more generally have dimensions, and in particular an overall diameter and an axial width, that correspond to the standardized sizes of the pneumatic tyres suitable for rims with the aforementioned standardized dimensions.

The spokes 5, and more particularly the ends 6, 7 thereof, are preferably made from a rubber-based material. The spokes also preferably contain reinforcing elements, based on reinforcing threads or composite structures comprising reinforcing fibres, in order to ensure the mechanical strength of said spokes 5 vis-à-vis radial compression.

Preferably, as can be seen in FIG. 2, the first end 6 of the spoke 5 is connected to the second end 7 of the spoke by a V-shaped central portion 8 of the spoke, in order to impart to the spoke 5 controlled flexibility allowing said spoke 5 to elastically accommodate the deformations of the tyre 2 during running and to ensure a degree of damped elastic suspension of the hub 3, and therefore of the vehicle, relative to the peripheral annular band 4. This makes it possible in particular to provide a degree of running comfort, which can be close to that obtained with usual pneumatic tyres.

According to the invention, the assembly device 1 comprises a plurality of pressing sub-assemblies 10 that are each assigned to fastening a separate spoke 5.

Preferably, the assembly device 1 comprises as many pressing sub-assemblies 10 distributed about the central axis Z3 as there are spokes 5 in the tyre 2.

All of the spokes 5 can thus be fastened simultaneously to the hub 3 and/or all of the spokes 5 can be fastened simultaneously to the peripheral annular band 4, respectively, in a single manufacturing step, which minimizes the manufacturing cycle time, while still benefiting from individualized management of each spoke 5.

The spokes 5, and as a result the associated pressing sub-assemblies 10, are preferably evenly distributed azimuthally about the central axis Z3.

For the sake of standardization, the spokes 5 are preferably all identical to each other.

The same preferably applies to the pressing sub-assemblies 10, which are duplicated identically to each other so as to form mutually interchangeable modules.

By way of indication, between 30 and 80 spokes 5, for example 64 spokes, and therefore that same number of pressing sub-assemblies 10 can be provided, in particular for a hub 3 the diameter of which corresponds to the diameter of a 12-inch to 24-inch rim.

Figure 3:
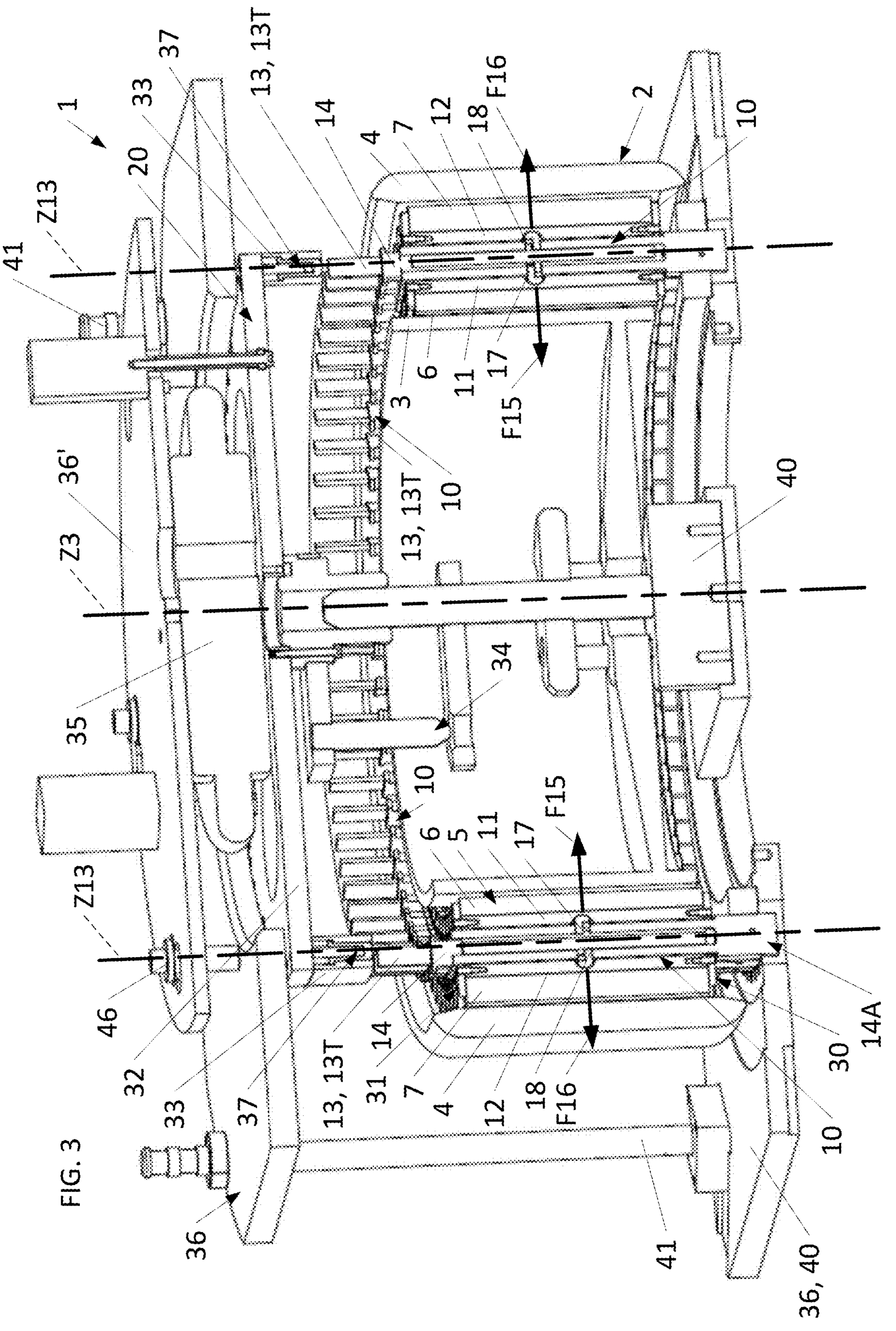
FIG. 3 shows, in a perspective view with cross section on a radial plane containing the central axis, an assembly device according to the invention.
Figure 4:
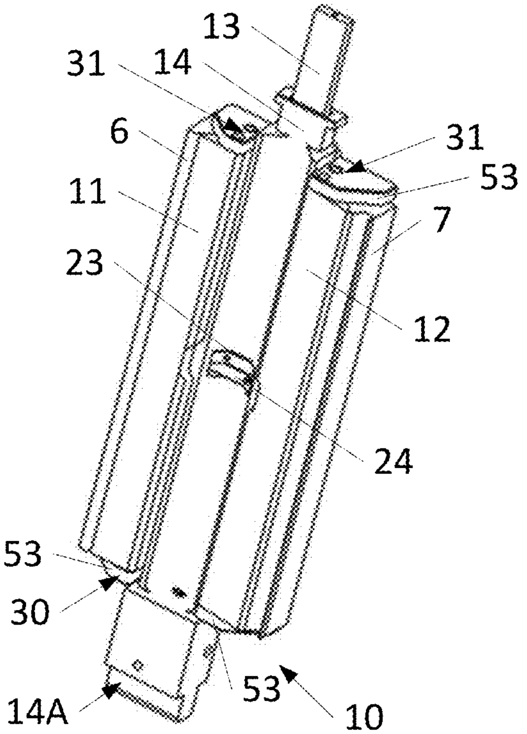
FIG. 4 shows, in a perspective view, a pressing sub-assembly used in the device of FIG. 3.
Figure 5:
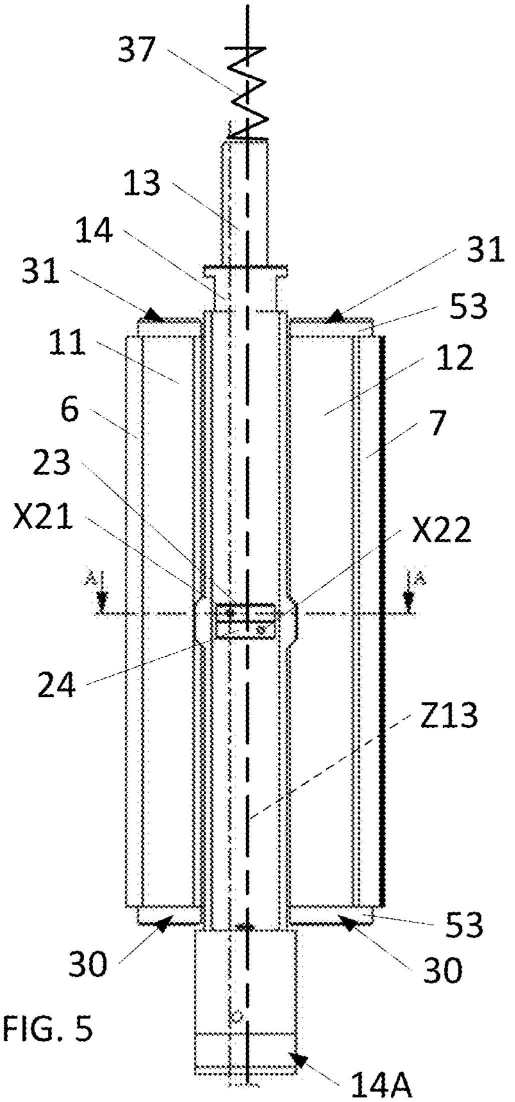
FIG. 5 is a face-on projection of the pressing sub-assembly of FIG. 4.

As can be seen in particular in FIGS. 3, 4 and 5, the pressing sub-assemblies 10 each comprise at least one pusher 11, 12 arranged to press one of the first and second ends 6, 7 of the spoke 5 in question against the receiving face 3E, 4I of the hub 3 or against the peripheral annular band 4 that corresponds to said end 6, 7, respectively, of the spoke 5.

The pushers 11, 12 are preferably formed by straight, rigid, preferably metal, bars.

Said pushers 11, 12 preferably extend parallel to the central axis Z3, over a length preferably at least equal to 30%, preferably at least equal to 50%, or even 70%, of the axial length of the ends 6, 7, in order to be correctly seated against said ends 6, 7.

Preferably, the axial length of each pusher 11, 12 and more particularly the axial length of the radially inner first pusher 11, does not exceed the axial length of the corresponding end 6, 7. This makes it possible to prevent any interference between the pusher 11, 12 and the corresponding receiving face 3E, 4I, in particular here between the first pusher 11 and the receiving face 3E of the hub 3. It also makes it possible to make a single pressing assembly 10, and more generally a single device 1, compatible with the assembly of a plurality of dimensions of spokes 5, and more generally with the assembly of a plurality of axial dimensions of tyres 2.

Figure 6:
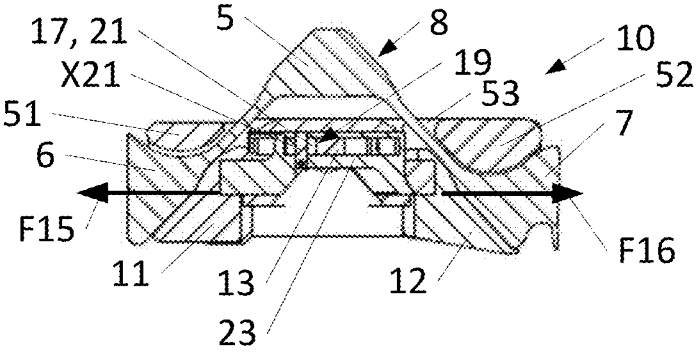
FIG. 6 shows, viewed from above, a view in cross section on a plane normal to the central axis, of the interaction between the pressing sub-assembly of FIG. 4 and the spoke that is subjected to the action of said sub-assembly.

The pushers 11, 12 preferably have a transverse cross section having a shape conjugate to the shape of the corresponding ends 6, 7, here for example a substantially triangular cross section one side of which follows the slope of the arm of the V-shaped central portion 8 of the spoke 5, as well as that face of the end that forms the continuation of said slope, as can be seen in FIG. 6.

As can be seen in FIGS. 4 to 6, each pusher 11, 12 can advantageously be associated with a flange 51, 52 that is secured to said pusher 11, 12 by one or more connectors 53 and thus allows the pusher 11, 12 to ensure a grip on the end 6, 7 on each side of the arm that attaches said end to the central portion 8 of the spoke 5, so as to prevent any tilting or loss of control of the trajectory of the end 6, 7 during the radial movement of the pusher 11, 12.

According to the invention, each of said pressing sub-assemblies 10 comprises a punch 13 that is mounted movably in an axial direction Z13 parallel to the central axis Z3, under the control of a drive system 20.

As visible in FIGS. 3, 4, 5 and 9A to 9C, said punch 13 is preferably guided in axial translation, in the axial direction Z13, by means of a sleeve 14 in which said punch 13 slides. The sliding guidance of the punch 13 may be provided by any appropriate means, notably by sliding on low-friction pads, or by rolling on the rollers. One end 14A of said sleeve 14 may advantageously form a fastening base allowing said sleeve 14 and, more generally, the corresponding pressing sub-assembly 10, to be positioned and fastened within the assembly device 1.

The punch 13 preferably takes the form of a rigid rod or blade, preferably made of a metal or of a composite material such as, for example, a resin-impregnated carbon fibre composite material of which the longitudinal direction coincides with the axial direction Z13.

According to the invention, the punch 13 has, as is clearly visible in FIGS. 8, 9A, 9B and 9C, at least one ramp 15, 16 which, in a radial plane containing the central axis Z3, diverges progressively from the axial direction Z13 and collaborates with a bearing member 17, 18 secured to the pusher 11, 12 so that when the drive system 20 moves the punch 13 axially against the bearing member 17, 18, the ramp 15, 16 causes said bearing member 17, 18 and, therefore, the pusher 11, 12 to move radially and thus, via the bearing member 17, 18 generates a clamping force F15, F16 that presses said pusher 11, 12 and, therefore, the end 6, 7 of the spoke 5 radially against the receiving face 3E, 4I.

The ramp 15, 16 may have any suitable profile that will allow the punch 13, as it progresses axially, to force progressive radial separation of the pusher 11, 12. Said profile may thus for example be a curved profile or, as is the case in FIG. 8, an inclined rectilinear profile.

The angle of inclination A15, A16 formed, in the radial plane in question, between the tangent to the profile of the ramp 15, 16 and the axial direction Z13 and, more generally, between the tangent to the profile of the ramp 15, 16 and the direction of the central axis Z3, will be non-zero and preferably comprised between 3 degrees and 40 degrees, or even between 3 degrees and 60 degrees.

The bearing member 17, 18 carried by the pusher 11, 12 may adopt any suitable shape for collaborating with the ramp 15, 16 of the punch 13.

Thus, for example, the bearing member 17, 18 may be formed of a finger fastened to the pusher, said finger preferably having a curved, preferably circular, contact surface, or may be formed by a counter-ramp the shape and orientation of which are substantially the conjugate of the shape and orientation of the ramp 15, 16 of the punch, so that said bearing member 17, 18 collaborates with the ramp 15, 16 of the punch 13 by sliding.

However, according to a preferred alternative form of embodiment, and as is visible in FIGS. 7, 8 and 9A to 9C, the bearing member 17, 18 is formed by a roller 21, 22 which is rotatably mounted on an axle X21, X22 borne by the pusher 11, 12 and orthoradial with respect to the central axis Z3, so that said roller 21, 22 rolls along the ramp 15, 16 as the punch 13 moves axially.

What is meant by "orthoradial" is a direction which is both perpendicular to a (geometric) radius extending from the central axis Z3 and contained in a plane normal to said central axis Z3.

Such an arrangement involving a roller 21, 22 minimizes the wearing of the ramps 15, 16 of the mechanism and ensures smooth operation of the pressing sub-assembly 10 as the ramp 15, 16 converts the axial movement of the punch 13 into a radial movement of the pusher 11, 12.

Figure 7:
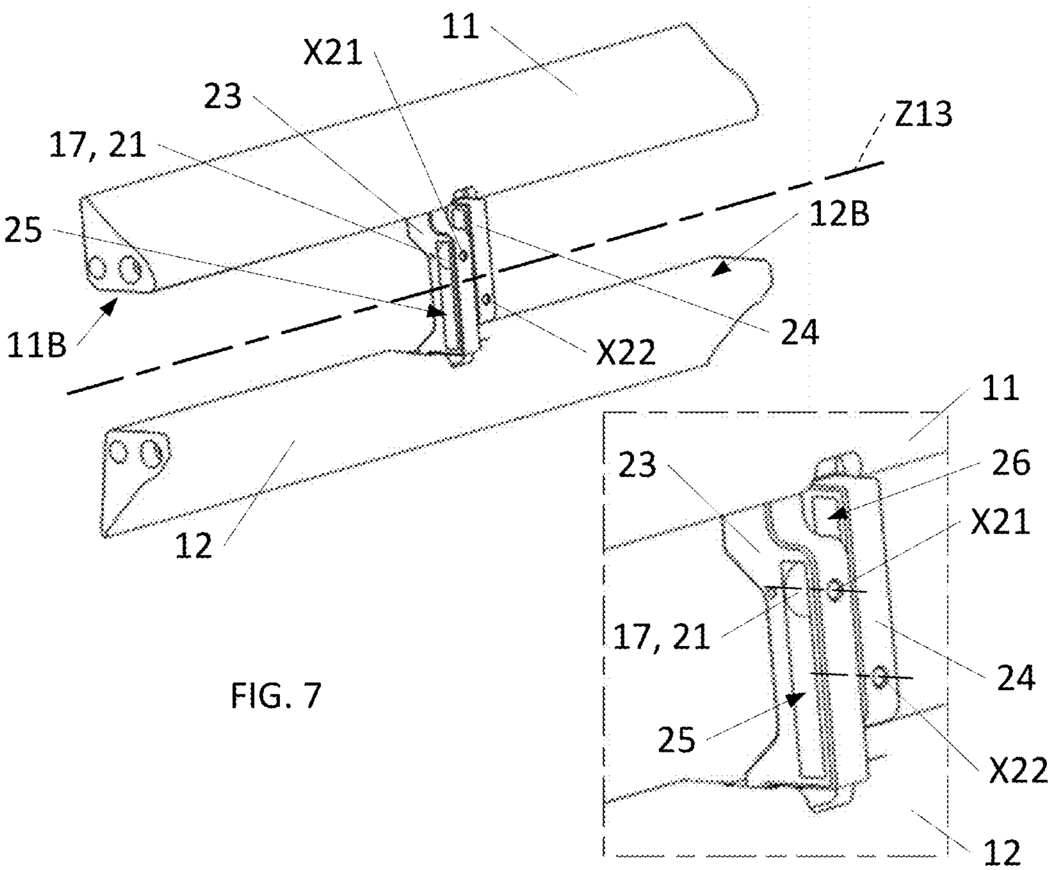
FIG. 7 shows, in a perspective view, with a partial enlarged view, the detail of a pair of pushers used by each of the pressing sub-assemblies present in FIGS. 3 and 4.
Figure 8:
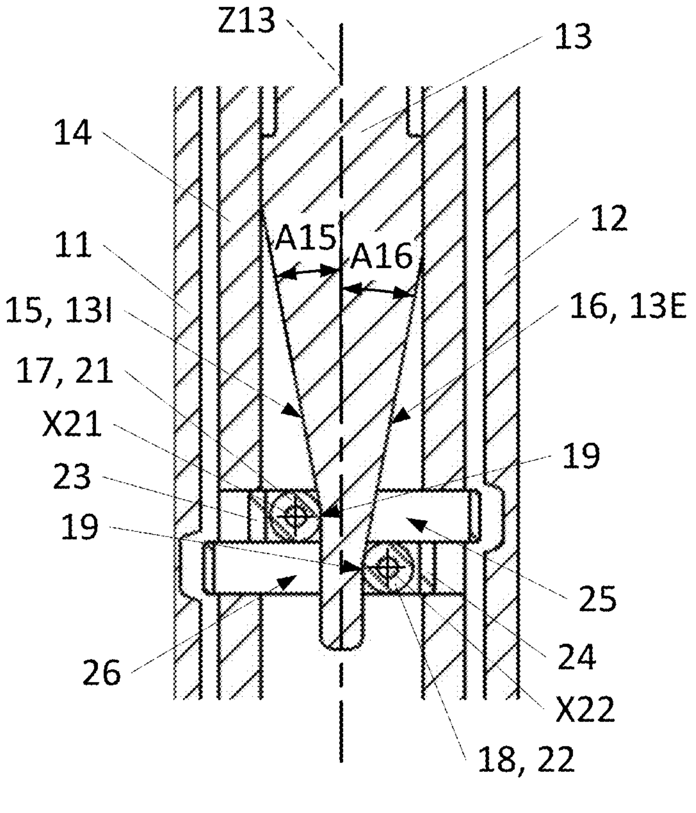
FIG. 8 shows, in a detailed view in cross section on a radial plane containing the central axis, the interaction between the punch and the pair of pushers of FIG. 7.

As a preference, as is clearly visible in FIGS. 7 and 8, the pusher 11, 12 has a guide barrel 23, 24 which delimits a through-slot 25, 26 into which the punch 13 is pushed as it moves axially and the inner wall of which has the bearing member 17, 18.

Advantageously, the guide barrel 23, 24 affords robust connection of the punch 13 to the pusher 11, 12 and improves the precision with which said punch 13 is guided.

The guide barrel 23, 24 may take the form of a tab projecting radially from the back 11B, 12B of the pusher 11, 12, preferably of one piece with said pusher 11, 12 and, and which has an oblong through-slot 25, 26 that allows the punch 13 to pass through said guide barrel 23, 24 by sliding, with clearance, inside said guide barrel 23, 24 in which the punch 13 advantageously remains captive.

As a preference, the bearing member 17, 18 is arranged in such a way that the contact area 19 of contact between the ramp 15, 16 and the bearing member 17, 18 is, on the one hand, situated on the back 11B, 12B of the pusher 11, 12 radially opposite the end 6, 7 and the receiving face 3E, 4I and, on the other hand, contained in the axial range H6, H7 that the end 6, 7 in question is to occupy along the central axis Z3.

"Axial range" or "axial extent" of an element, here for example the axial range H6, H7 of the end 6, 7 of the spoke 5, denotes the extent, along the central axis Z3, between two fictitious planes that are normal to said central axis Z3 and tangent to the axial ends of the element in question. In an equivalent manner, "axial range" thus denotes the segment of the central axis Z3 that corresponds to the orthogonal projection of the element in question onto said central axis Z3.

"Back" 11B, 12B of the pusher 11, 12 denotes a face of the pusher that is situated radially opposite the "front" face of said pusher 11, 12 by which face said pusher 11, 12 presses against the end 6, 7 and can thus compress the end 6, 7 against the receiving face 3E, 4I.

It will be noted that, in order to be correctly seated on the hub 3 and effectively support the peripheral annular band 4, the spokes 5, and more particularly the ends 6, 7 of said spokes 5, preferably have an axial extent H6, H7 representing between 70% and 105% of the axial extent H3 of the hub 3 and/or, as an alternative or in addition to the preceding criterion, between 70% and 100% of the axial extent H4 of the peripheral annular band 4.

Advantageously, insofar as the bearing member 17, 18 of the lever 15, 16 acts on the back 11B, 12B of the pusher 11, 12 in an axial position that is situated facing the axial range H6, H7 occupied by the end 6, 7 of the spoke, and more preferably insofar as the bearing member 17, 18 of the lever 15, 16 acts on the back 11B, 12B of the pusher in an axial position that is substantially centred on the axial range H6, H7 occupied by the end 6, 7, then the pusher 11, 12 is particularly stable and the clamping force F15, F16 is properly distributed by said pusher 11, 12 over the whole axial range H6, H7 of the end 6, 7.

Preferably, the contact area 19 that exists between the ramp 15, 16 of the punch 13 and the bearing member 17, 18 of the pusher 11, 12 is strictly contained in an axial range H0 referred to as the "central axial range" H0 that is centred on the axial range H11, H12 occupied by the pusher 11, 12 and the axial extent of which represents less than 40%, preferably less than 20%, or even less than 15% of the extent of said axial range H11, H12 occupied by the pusher 11, 12.

The contact area 19 thus occupies a relatively small axial extent which is initially, and which remains, during the axial movements of the punch 13 and the resulting radial movements of the pusher 11, 12, contained in the central axial range H0. Therefore, and above all, said contact area 19 is, and remains, substantially centred on the axial range H11, H12 occupied by the pusher 11, 12 and therefore is, and remains, substantially centred on the axial range H6, H7 that will be occupied by the end 6, 7 when said pusher 11, 12 comes to act on the end 6, 7 to apply the clamping force F15, F16.

By positioning the bearing member 17, 18 substantially in the middle of the pusher 11, 12, that is substantially halfway along the length of said pusher 11, 12, and by therefore applying the clamping force F15, F16 substantially at the middle of the pusher 11, 12, the conversion mechanism formed by the ramp 15, 16 and the bearing member 17, 18 makes it possible to stress the pusher 11, 12, and therefore the end 6, 7 of the spoke, in a relatively balanced manner, and therefore makes it possible for the pusher 11, 12 to be moved radially without causing any pronounced tilting of said pusher 11, 12 relative to the central axis Z3 or any jamming of said pusher 11, 12 through bracing effect.

As a preference, the pusher 11, 12 is radially guided by a first guide 30 situated at a first axial end of said pusher 11, 12 and by a second guide 31 separate from the first guide 30 and situated at a second axial end of said pusher 11, 12 opposite the first end, so that the contact area 19 of contact between the ramp 15, 16 of the punch 13 and the bearing member 17, 18 of the pusher 11, 12 is situated between said first and second guides 30, 31, at a distance from said guides 30, 31, preferably equidistant from said guides 30, 31.

Advantageously, such dual guidance, by guides 30, 31 that are situated axially on either side of the contact area 19, and therefore on either side of the point of application of the clamping force F15, F16 at the point at which the ramp 15, 16 of the punch 13 applies, via the bearing member 17, 18, its action on the pusher 11, 12, advantageously provides accurate, stable guidance that prevents any tilting or jamming of the pusher 11, 12 through a bracing effect during the radial movements of said pusher 11, 12, even though the force supplied by the ramp 15, 16 is located in a contact area 19 that is relatively narrow.

By way of example, the first guide 30 and the second guide 31 can comprise fingers that protrude axially at the ends of the pusher 11, 12, more particularly fingers that project axially on the connectors 53 that fasten the flanges 51, 52 on the pushers 11, 12, said fingers then being guided in substantially radial grooves provided in first and second annular plates that are centred on the central axis Z3 and extend along planes normal to the central axis Z3, axially on either side of the pushers 11, 12.

As a preference, a suspension spring 37 is interposed axially between each punch 13 and the drive system 20 so as to give the punch 13 a predetermined resilience to the resistance offered by the pusher 11, 12 to said punch 13 in reaction to the clamping force F15, F16.

Advantageously, the elastic deformation of the suspension spring 37 makes it possible to adapt, and notably to limit, the axial pushing-in of the punch 13, and therefore the intensity of the radial clamping force F15, F16 developed against the pusher 11, 12 of the end 6, 7 of the spoke 5, according to the position of and dimensional tolerances on these moving parts, and according to the behaviour of these parts and particularly to the resistance encountered.

The stiffness of the suspension spring 37 will of course be selected accordingly.

The suspension spring 37 may further be preloaded by a calibration member such as an adjusting screw or a shim of chosen thickness.

As a preference, the suspension spring 37 is designed to be loaded in compression, as much for the sake of convenience of construction as for the sake of guaranteeing the robustness of the suspension mechanism.

Advantageously, the resilience afforded by the suspension spring 37 allows the punch 13 to adapt its axial movement on a case-by-case basis and therefore allows the radial movement of the pusher 11, 12 and the intensity of the clamping force F15, F16 that said pusher 11, 12 applies to the end 6, 7 of the spoke to be regulated.

This ensures in particular that the end 6, 7 of each of the spokes 5, which is gripped and compressed radially between the pusher 11, 12 and the receiving face 3E, 4I, is suitably positioned and is subjected to a clamping force F15, F16 that is sufficiently strong to guarantee satisfactory adhesion of said end 6, 7 on the receiving face 3E, 4I, but without however exceeding an intensity threshold that would be damaging for the spoke 5 or for said receiving face 3E, 4I.

The suspension spring 37 may adopt any form suited to the intended suspension function, for example the form of a solid spring, such as a helical spring or a stack of spring washers, or else the form of a pneumatic spring.

As a preference, at least some of the pressing sub-assemblies 10, and preferably all of the pressing sub-assemblies 10, each comprise a punch 13 which is provided with a first ramp 15 designed to engage with a first bearing member 17 borne by a first pusher 11 designed to press the first end 6 of the spoke 5 in question against the hub 3, and with a second ramp 16 designed to engage with a second bearing member 18 borne by a second pusher 12 designed to press the second end 7 of said spoke 5 against the peripheral annular band 4.

Each pressing sub-assembly 10 thus preferably comprises a pair of opposing pushers 11, 12 so to be able to manage the two ends 6, 7 of a single spoke 5, that is, all of the ends 6, 7 of a single spoke 5, and thus be able to ensure the fastening of the spoke 5 to both the hub 3 and the peripheral annular band 4.

This provides great stability and satisfactory efficiency to the pressing sub-assemblies 10 and more generally to the device 1.

As a preference, each pressing sub-assembly 10 comprises a single punch 13, which will advantageously be shared by the two pushers 11, 12 of the pressing sub-assembly 10, and will, for that purpose, therefore comprise two ramps 15, 16, each dedicated to one of said pushers 11, 12.

Such a choice notably reduces the bulkiness of the pressing sub-assembly 10 and allows better control over the order and amplitude of the respective radial movements of the first pusher 11 and of the second pusher 12 relative to one another.

As a preference, as visible notably in FIG. 8, the ramps 15, 16 are formed on two edges 131, 13E of the punch 13 that are radially opposite to one another, so that said punch 13 has a pointed shape which, through a wedge effect, as the punch progresses axially with respect to the pushers 11, 12 which are axially fixed, gradually causes the pushers 11, 12 to separate radially from one another.

According to one preferred embodiment option, each of the first and second pushers 11, 12 has a guide barrel 23, 24, and the corresponding through-slots 25, 26 are axially aligned so that the punch 13 can pass through them simultaneously, as visible in FIGS. 7 and 8.

More specifically, the first and second guide barrels 23, 24 may be axially superposed with one another, preferably in sliding contact with one another, in an arrangement which is particularly compact and allows said guide barrels and, therefore, the points of contact 17, 18, to be kept substantially in the middle of the pushers 11, 12.

When the through-slots 25, 26 are aligned in this way, the first and second bearing members 17, 18, preferably formed of a first and second roller 21, 22, can then preferably be situated on radially opposite portions of the internal walls of the first and second through-slots 25, 26 so as to come to bear respectively against the first ramp 15 and the second ramp 16 which ramps are themselves situated on the radially opposite edges 131, 13E of the punch 13.

Here again, this encourages the compactness and stability of the motion conversion mechanism whereby a pointed punch 13 through a wedge effect separates the opposing pushers 11, 12 from one another.

As a preference, the first and second ramps 15, 16 and the bearing members 17, 18 are arranged in such a way that the drive system 20 causes simultaneous movement of the first pusher 11 and of the second pusher 12 against, respectively, the first end 6 of the spoke 5 and the second end 7 of the spoke 5.

A synchronous movement makes it possible in particular to fasten the two ends 6, 7 in a single step, which makes it possible to minimize the manufacturing cycle time of the tyre 2.

Such synchronous movement also makes it possible to balance the, respectively centripetal and centrifugal, tensile forces, that result from the application of the clamping forces F15, F16 and that bring about tensile radial extension of the spoke 5 notably as a result of elastic deflection of the central portion 8 of said spoke 5. This balancing of the tensile forces makes it possible to avoid radial misalignment of the spoke 5.

Figure 9C:
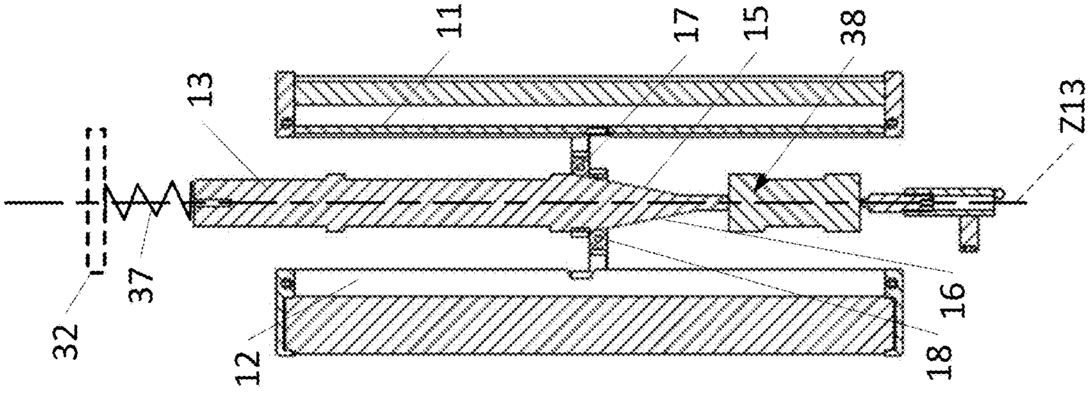
FIGS. 9A, 9B and 9C show, in views in cross section on a radial plane containing the central axis, successive steps of axially driving the punch and therefore of progressively radially separating the pushers shown in FIGS. 7 and 8, FIG. 9A corresponding to a retracted configuration in which the separation of the pushers is minimal, FIG. 9B to a semi-deployed configuration defining an intermediate separation of the pushers, and FIG. 9C corresponding to a fully deployed configuration defining the maximum separation of the pushers.
Figure 9B:
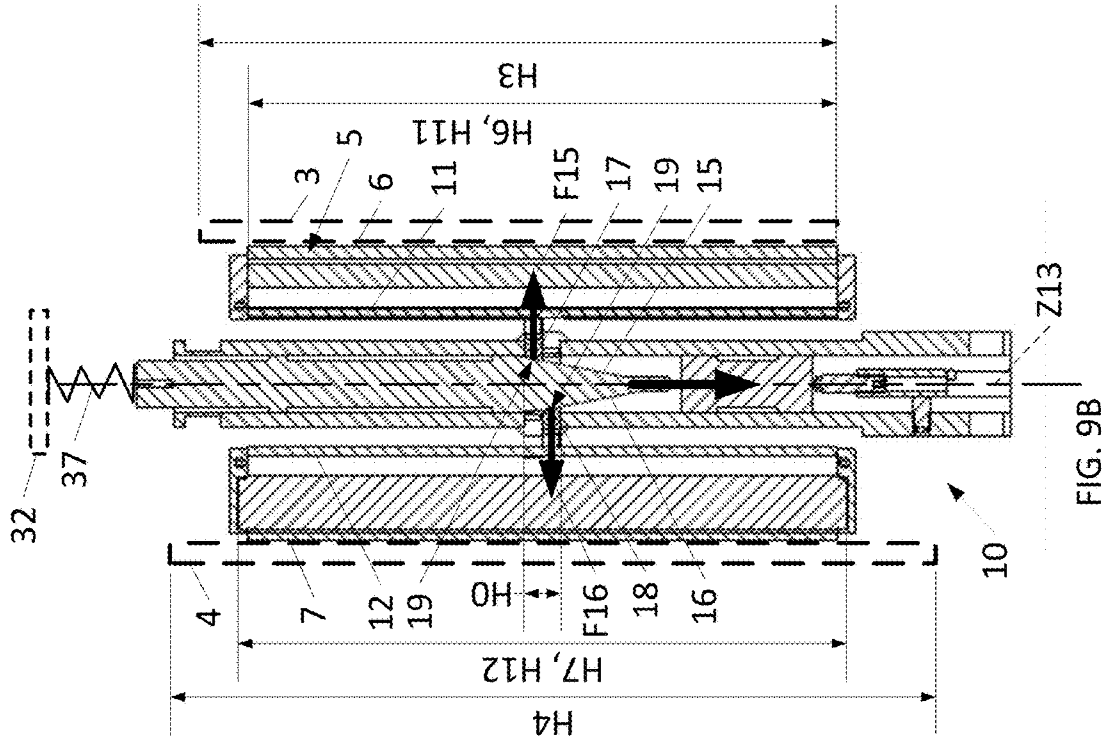
Figure 9A:
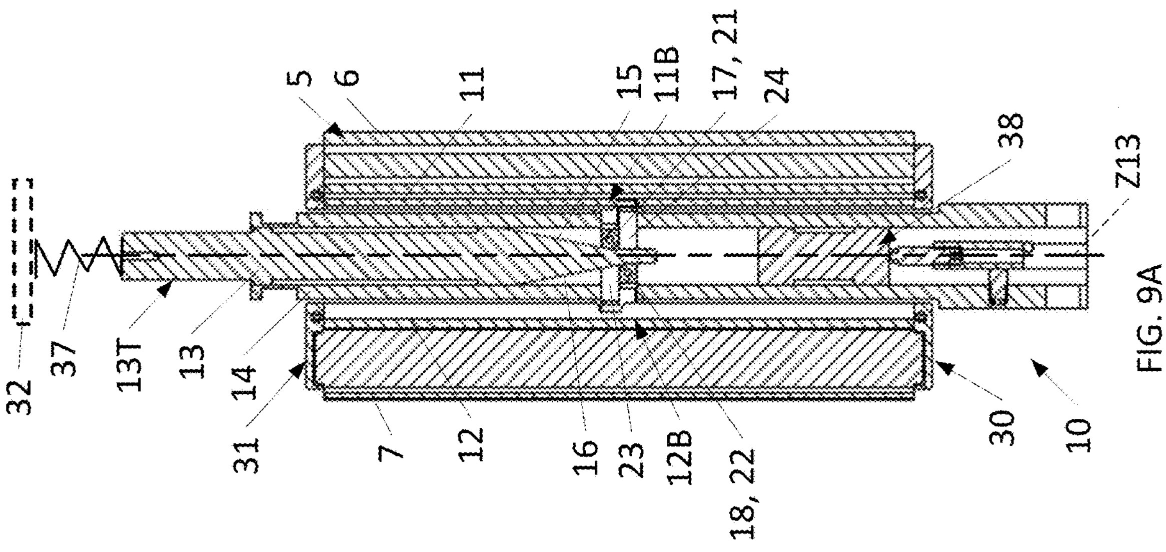

It will be noted that when the first bearing member 17 and the second bearing member 18 are axially offset from one another, notably as a result of the axial superposition of the guide barrels 23, 24, an identical axial offset between the first ramp 15 and the second ramp 16 can then be provided, as visible in FIGS. 8 and 9A, so that engagement of the first ramp 15 with the first bearing member 17 occurs simultaneously with engagement of the second ramp 16 on the second bearing member 18 and so that the separation of the pushers 11, 12 then occurs substantially synchronously, preferably identically in terms of radial amplitude, as the punch gradually continues to progress axially (in this instance downwards in FIGS. 9A, 9B and 9C, and as indicated by the corresponding arrow in FIG. 9B).

In some circumstances, temporally separate movements of the pushers 11, 12 may, however, be preferable. This could for example be the case when the two ends 6, 7 of a single spoke 5 have a very different geometry and/or stiffness from each other and therefore require different preloading to satisfactorily reach their point of contact with their respective receiving face 3E, 4I.

The ramps 15, 16 could then for example be axially offset as a consequence.

As a preference, prior to moving the punch 13 and therefore prior to moving the pushers 11, 12, the receiving face 3E of the hub 3 and, respectively, the receiving face 4I of the peripheral annular band 4 could be coated with adhesive, for example with two-part polyurethane adhesive, prior to pressing the ends 6, 7 against said receiving faces. A heat-curing operation could then be applied in order to polymerize the adhesive, while maintaining the radial compression on said ends 6, 7 to keep them pressed against said receiving faces 3E, 4I.

Advantageously, joining the two ends 6, 7 to their adhesive-coated respective receiving faces 3E, 4I during the course of the one same deployment operation, this being regardless of whether the deployment operation is synchronous or with an offset, will then enable curing to be performed in a single heat cure step rather than in two successive heat cure steps.

Preferably, the assembly device 1 comprises a shared drive system 20, common to a plurality of the pressing sub-assemblies 10, and preferably common to all of the pressing sub-assemblies 10.

As a preference, said shared drive system 20 for this purpose comprises an actuating plate 32 which is mounted movably in axial translation along the central axis Z3 and has a series of end caps 33 distributed about the central axis Z3 and arranged to each engage the tail 13T of a punch 13 so as to be able to apply axial thrust to said punch 13.

Each end cap 33 preferably contains a suspension spring 37 as described above, preferably interposed in compression between the closed end of said end cap 33 and the tail 13T of the punch.

The actuating plate 32 is preferably normal to the central axis Z3, and preferably takes the form of a disc.

Said actuating plate 32 is preferably associated with a poka-yoke feature 34 enabling the angular position of the actuating plate 32 and, more particularly, of the series of end caps 33 to be identified in terms of yaw about the central axis Z3, with respect to the various pressing sub-assemblies 10, so that the actuating plate 32 and the end caps 33 can be suitably positioned facing the various punches 13.

The drive system 20 will preferably comprise a motor able to generate the axial movement of the actuating plate 32 and therefore of the punches 13.

It will be noted that the actuating plate 32 will enable all the end caps 33 to be moved simultaneously in an axial movement of the same amplitude and therefore give each punch 13 the same potential capacity for movement. This potential capacity for movement, which is the same for all of the punches 13 and therefore perfectly controlled, will be adjusted locally and automatically on a case-by-case basis for each punch 13 through action of the suspension spring 37, according to the behaviour of the spoke 5 and of the pushers 11, 12 of the pressing sub-assembly 10 concerned.

Figure 11:
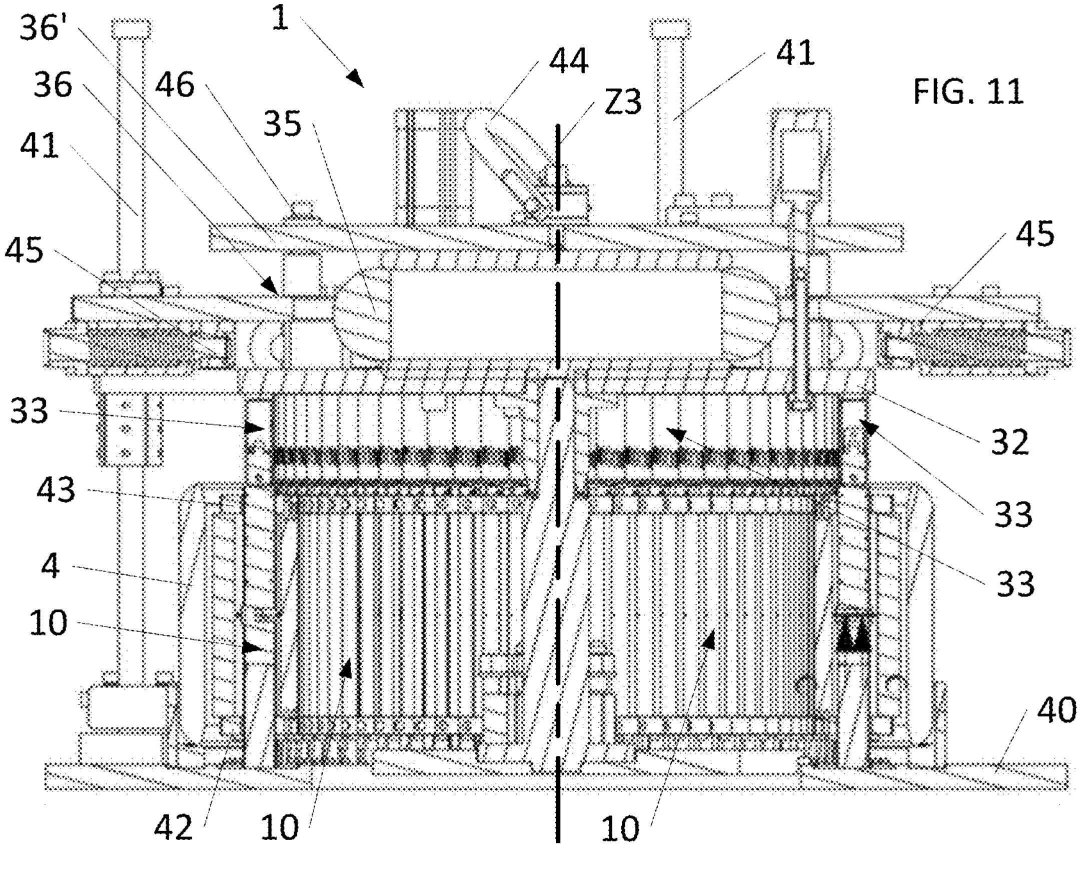
FIG. 11 is a view, in cross section on a radial plane containing the central axis, of the device of FIG. 10.

According to one embodiment possibility, the motor that provides the movement of the actuating plate 32 will be formed by a ram 35, preferably an annular ram 35, which is interposed between a portion 36' of a fixed superstructure 36 of the assembly device 1 and the mobile actuating plate 32, as visible in FIG. 3 or FIG. 11.

Moreover, each pressing sub-assembly 10 preferably has an ejector 38 designed to be able to push the punch 13 back by forcing a retreating axial movement upon said punch 13 (in this instance in the upwards vertical direction in FIG. 9C) so as to disengage the ramps 15, 16 from the bearing members 17, 18 and thus allow radial retraction of the pushers 11, 12 once the ends 6, 7 of the spoke have been fastened to the hub 3 and to the peripheral annular band 4.

Said ejector 38 may advantageously form, against the punch 13 and as is visible in FIG. 9C, an axial end-of-travel end stop for the advancing axial movement of the punch 13 (in this instance a downward vertical movement in FIGS. 9B and 9C) that allows the punch to engage the ramps 15, 16 against the bearing members 17, 18 and to deploy the pushers 11, 12.

The ejector 38 may potentially be used, through suitable adjustment of the axial position of said ejector 38 at which the punch 13 reaches said ejector 38, to manage an axial counter-force against the punch 13 and, therefore, against the suspension spring 37, and thus refine the axial movement of the punch 13 and therefore the intensity of the radial clamping forces F15, F16 developed.

As a preference, as illustrated in FIG. 3, the assembly device 1 is arranged so that the central axis Z3 is vertical.

The assembly device 1 may then comprise a base 40 which supports the superstructure 36 and which forms a substantially horizontal plate designed to accept the hub 3.

Vertical pillars 41 will be fastened to said base 40 and will make it possible, as notably visible in FIG. 11, in particular to fasten, on a first level above the base 40 and parallel to said base 40, a first annular plate 42 arranged to receive the peripheral annular band 4 and form the first guides 30 guiding the lower axial ends of the pushers 11, 12, which first annular plate 42 is pierced at its centre to leave the space necessary for the hub 3, the spokes 5 and the pressing sub-assemblies 10 to pass through, and then, on an upper level, a second annular plate 43 arranged to form the second guides 31 that guide the upper axial ends of the pushers 11, 12.

Figure 10:
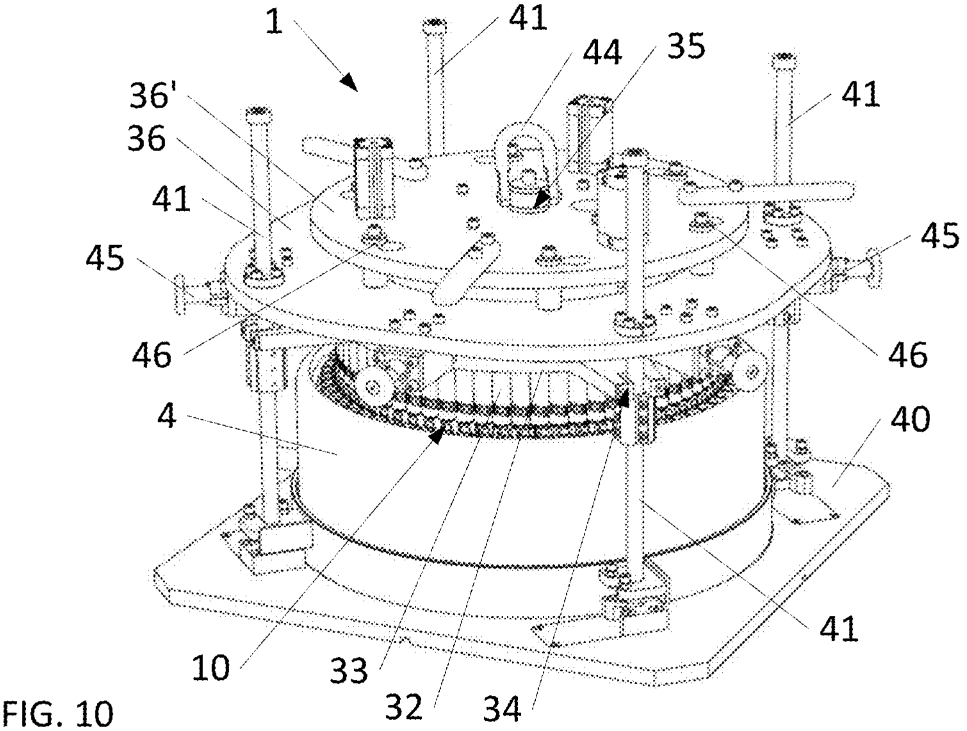
FIG. 10 is a perspective overall view of an alternative form of the assembly device according to the invention.

The vertical pillars 41 may also receive a third level, forming the superstructure 36, of which a portion 36', which is preferably removable, acts as a fixed support for the annular ram 35, as visible in FIGS. 3, 10 and 11.

It will also be noted that the use of punches 13 advantageously allows the drive system 20 to be offset axially beyond the pushers 11, 12 and the ends 6, 7 of the spokes 5 and preferably allows the drive system 20 to be grouped at just one end of the pushers 11, 12, in the axial direction, in this instance in the upper part of the assembly device 1, the end where the tails 13T of the set of punches 13 emerge axially from their respective sleeves 14.

The assembly device 1 thus has satisfactory compactness and low thermal inertia, while the drive system 20 requires a relatively small number of parts and motors (in this instance even a single motor will suffice) to drive all of the pressing sub-assemblies 10.

It will be noted that, as a preference, the motor, in this instance the ram 35, is removable, so that it can be removed from the device 1 for the purposes of, and during, the heat curing operation. As a preference, more generally, the unit formed by the removable portion 36' of the superstructure 36 and by the ram 35, is removable, so that it can be removed from the device 1 for the purposes of, and during, the heat curing operation. This advantageously makes it possible to reduce the mass that has to be heated, and therefore reduce the thermal inertia of the device. This also means that the ram 35 does not have to be subjected to thermal cycles that could cause premature wearing thereof.

To this end, reversible fixings 46 may be provided between, on the one hand, the fixed part of the superstructure 36, in this instance formed by a plate which is fastened to the pillars 41 and, on the other hand, the removable unit formed by the removable portion 36' of said superstructure 36 and the ram 35.

A lifting ring 44 may advantageously be provided so that the removable unit containing the ram 35 can be lifted and handled or, respectively, so that the entirety of the device 1 can be lifted, depending on whether the reversible fixings 46 have locked the removable unit to the rest of the device 1 or, rather, have released the removable unit from the rest of the device 1.

According to one preferred feature which may constitute an entire separate invention, the device 1 may comprise one or more latches 45 arranged in such a way as to passively keep the punches 13 in a pushed-in position after the drive system 20 has moved said punches 13 axially, so as to keep the ends 6, 7 of the spokes 5 pressed against their respective receiving faces 3E, 4I.

The engagement of the latches 45 will thus enable the spokes 5 to be kept in place for bonding after the drive system 20 has been deactivated and, where applicable, after the drive system 20 has been removed, in this instance after the upper unit comprising the ram 35 and the removable portion 36' of the superstructure 36 has been removed. It will then be possible to proceed with the heat cure without having to keep the drive system 20 activated and after having temporarily removed from the device 1 any superfluous mass that would require heating, thereby making it possible to save energy and economize on cycle time.

Figure 12:
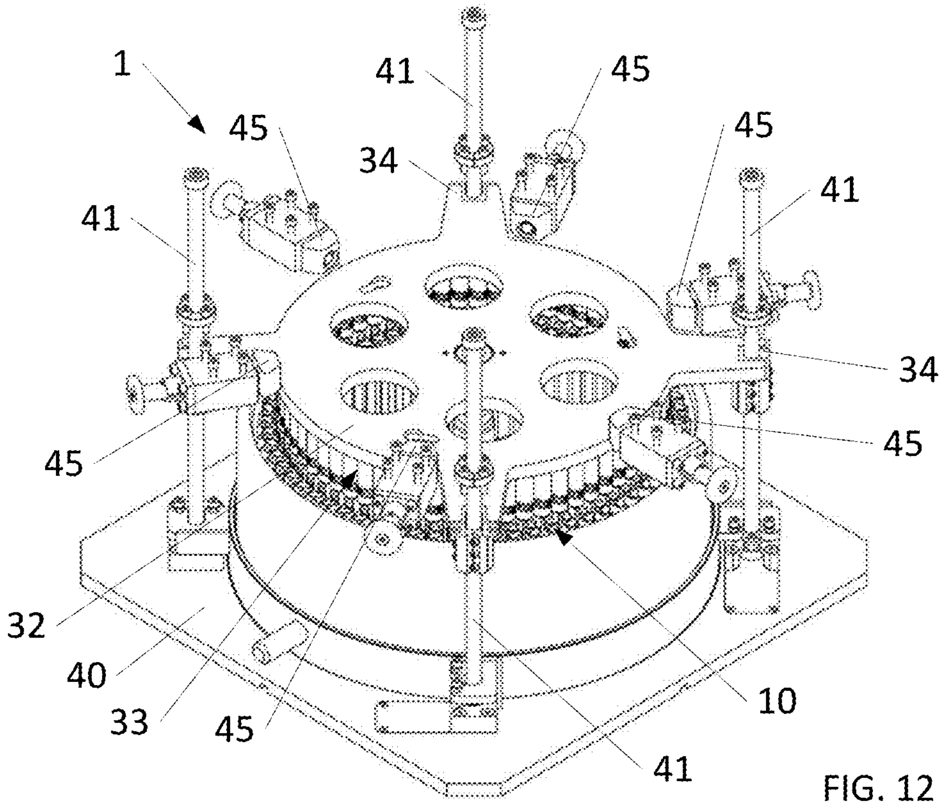
FIG. 12 is a perspective view of the device of FIGS. 10 and 11, from which the upper part of the drive system has been omitted in order to reveal, on the one hand, the actuating plate that allows the punches to be driven in axially in order to separate the pushers and, on the other hand, the latches intended to passively keep said actuating plate, and therefore the punches, in the pushed-in position during the heat cure operation, said latches here being in the disengaged configuration.
Figure 13:
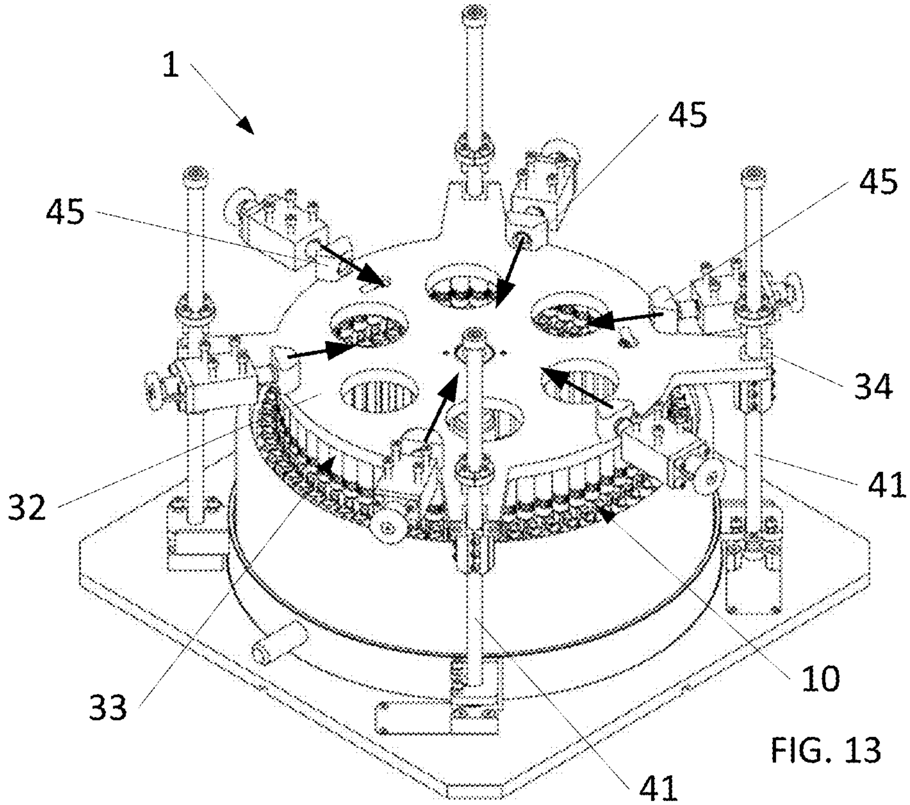
FIG. 13 illustrates, in the same view as FIG. 12, the device of FIG. 12 once the latches have engaged in order to retain the plate and so immobilize the punches in the pushed-in position, thus keeping the pushers in the separated position, and therefore keeping the ends of the spokes pressed against their respective receiving faces.

The latches 45 will be alternately disengaged (FIG. 12) in order to allow the axial movements of the actuating plate 32, in this instance with respect to the superstructure 36, and then engaged (FIG. 13) in order to lock the actuating plate 32 in the axial position that keeps the ends 6, 7 of the spokes 5 against the receiving faces 3E, 4I.

Automatic engagement of the latches 45 may be envisioned, for example by means of a spring which throws the catching part of each latch against the actuating plate 32, in this instance into the gap comprised axially between the fixed portion of the superstructure 36 and the actuating plate 32 as soon as the actuating plate 32 reaches the desired axial position, and therefore as soon the punches 13 are suitably pressing the ends 6, 7 of the spokes 5 against the receiving faces 3E, 4I.

FIGS. 10 to 13 depict a second alternative form of embodiment of the device 1 which essentially reprises the features and operation described in the foregoing and which differs from the first alternative form of FIG. 3 notably in that the poka-yoke features 34 this time are formed at the ends of star branches of the actuating plate 32 and collaborate in axial sliding with the pillars 41 rather than being located in the central space of the device.

This second alternative form notably facilitates the installation of the poka-yoke features 34 and that of the latches 45, which latches 45 may notably be fastened to the fixed portion of the superstructure 36 and comprise catching portions that move radially.

Of course, the invention is in no way limited solely to the alternative forms of embodiment described above, and a person skilled in the art could particularly isolate or freely combine any of the aforementioned features, or replace them with equivalent features.

The invention claimed is:

1. An assembly device for manufacturing a tire that comprises a hub having a central axis, a peripheral annular band coaxial with the hub, and a plurality of spokes that connect the hub to the peripheral annular band, each spoke comprising a first end fastened on a radially outer face of the hub forming a first receiving face and a second end fastened on a radially inner face of the peripheral annular band forming a second receiving face, the assembly device comprising:

a plurality of pressing sub-assemblies that are each assigned to fastening a separate spoke and that each comprise at least one pusher arranged to press one of the first and second ends of a given spoke against the receiving face of the hub or of the peripheral annular band, respectively, that corresponds to the one of the first and second ends of the spoke, wherein each of the pressing sub-assemblies comprises a punch that is mounted movably in an axial direction parallel to the central axis, under control of a drive system, and that has at least one ramp which, in a radial plane containing the central axis, diverges progressively from the axial direction and collaborates with a bearing member secured to the pusher so that when the drive system moves the punch axially against the bearing member, the ramp causes the bearing member and, therefore, the pusher to move radially and thus, via the bearing member, generates a clamping force that presses the pusher and, therefore, the one of the first and second ends of the spoke radially against the receiving face, and wherein a suspension spring is interposed axially between each punch and the drive system so as to give the punch a predetermined resilience to resistance offered by the pusher to the punch in reaction to the clamping force.

2. The assembly device according to claim 1, wherein the bearing member is arranged in such a way that a contact area of contact between the ramp and the bearing member is situated on a back of the pusher radially opposite the one of the first and second ends and the receiving face and contained in an axial range that the one of the first and second ends is to occupy along the central axis.

3. The assembly device according to claim 1, wherein the bearing member is formed by a roller which is rotatably mounted on an axle borne by the pusher and orthoradial with respect to the central axis, so that the roller rolls along the ramp as the punch moves axially.

4. The assembly device according to claim 1, wherein the pusher has a guide barrel which delimits a through-slot into which the punch is pushed as it moves axially and an inner wall of which has the bearing member.

5. The assembly device according to claim 4, wherein at least some of the pressing sub-assemblies each comprise a punch which is provided with a first ramp designed to engage with a first bearing member borne by a first pusher designed to press the first end of the given spoke against the hub, and with a second ramp designed to engage with a second bearing member borne by a second pusher designed to press the second end of the given spoke against the peripheral annular band, wherein each of the first and second pushers has a guide barrel, wherein corresponding through-slots are axially aligned so that the punch can pass through them simultaneously, and wherein the first and second bearing members are situated on radially opposite portions of the inner walls of the corresponding through-slots so as to come to bear, respectively, against the first ramp and the second ramp which are situated on radially opposite edges of the punch.

6. The assembly device according to claim 1, wherein the pusher is radially guided by a first guide situated at a first axial end of the pusher and by a second guide separate from the first guide and situated at a second axial end of the pusher opposite the first end, so that a contact area of contact between the ramp of the punch and the bearing member of the pusher is situated between the first and second guides, at a distance from the first and second guides.

7. The assembly device according to claim 1, wherein at least some of the pressing sub-assemblies each comprise a punch which is provided with a first ramp designed to engage with a first bearing member borne by a first pusher designed to press the first end of the given spoke against the hub, and with a second ramp designed to engage with a second bearing member borne by a second pusher designed to press the second end of the given spoke against the peripheral annular band.

8. The assembly device according to claim 7, wherein the first and second ramps and the bearing members are arranged in such a way that the drive system causes simultaneous movement of the first pusher and of the second pusher against, respectively, the first end of the spoke and the second end of the spoke.

9. The assembly device according to claim 1, wherein the assembly device comprises a shared drive system, common to several of the pressing sub-assemblies, the shared drive system comprising an actuating plate which is mounted movably in axial translation along the central axis and has a series of end caps distributed about the central axis and arranged to engage a tail of a punch so as to be able to apply axial thrust to the punch.

10. The assembly device according to claim 1, wherein a number of pressing sub-assemblies distributed about the central axis is equal to a number of spokes in the tire.

11. The assembly device according to claim 1, wherein the assembly device comprises one or more latches arranged in such a way as to passively keep the punches in a pushed-in position after the drive system has moved the punches axially, so as to keep the ends of the spokes pressed against respective receiving faces.

* * * * *